Patented Aug. 11, 1931

1,818,856

UNITED STATES PATENT OFFICE

JESSE D. LANGDON, OF LOS ANGELES, CALIFORNIA, ASSIGNOR TO LANGDON ENGINEERING CORPORATION, OF LOS ANGELES, CALIFORNIA

VALVE

Application filed December 15, 1927. Serial No. 240,298.

The present invention relates to valves, and aims to provide a novel and improved self closing or automatic stop valve.

Another object is the provision of a self closing valve having novel means for cushioning or retarding the final closing movement of the valve member, in order that the valve will close with a soft motion and without a jar or shock.

A further object of the invention is the provision of a dash pot arrangement in a valve to cushion or retard the final closing movement of the valve member.

Still another object is the provision of a member within the valve casing or body which is cooperable with the valve member to cushion the closing movements thereof, and which also serves to prevent leakage along the valve stem or rod.

It is also an object of the invention to provide a valve of the character indicated comprising a novel construction and assemblage of the component elements.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1:
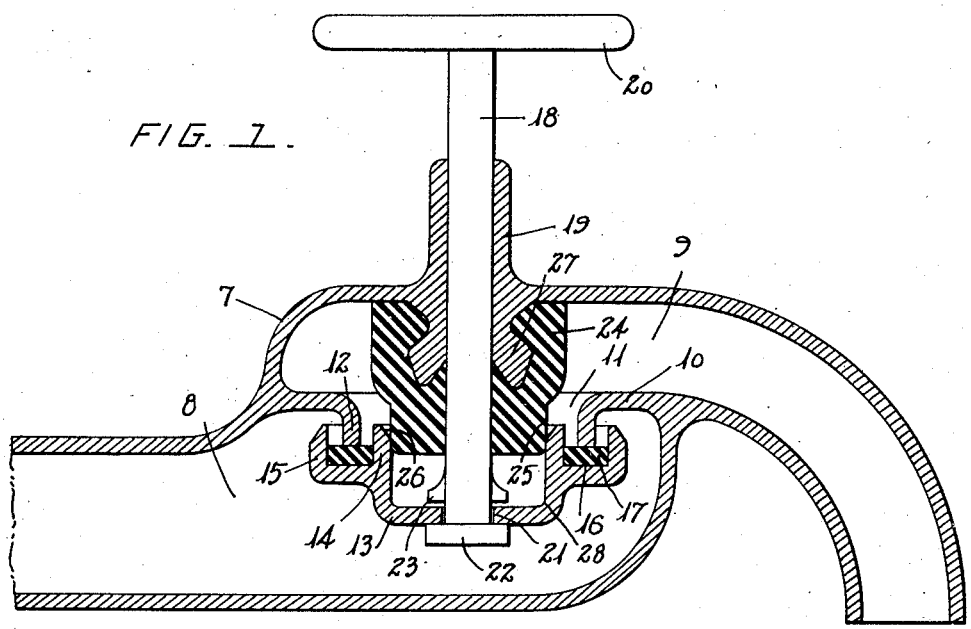
Figure 1 is a median section of the improved valve, the valve stem or rod being shown in elevation, and the valve being closed.

The valve casing or body 7 may be of any suitable size and shape, and has the inlet 8 and outlet 9 with a partition 10 between them provided with the port or opening 11, and the partition 10 has a lip 12 surrounding said opening and extending in the direction opposite to the direction of flow.

A valve member or head 13 is seatable in the direction of flow against the lip or annular seat 12, and has the concentric annular flanges 14 and 15 defining an annular groove 16 to receive the lip 12. A rubber or other suitable gasket 17 is seated in the groove 16 to contact with the lip 12 for stopping the flow of fluid through the port 11. The flanges 14 and 15 are spaced from the lip 12 on the inner and outer sides thereof.

The valve stem or rod 18 is slidable through an outstanding guide 19 with which the casing 7 is provided, and said stem has a handle or knob 20 on its outer end. The inner terminal of the stem passes loosely through a central aperture 21 in the valve member 13 and has a collar 22 forming a relief valve to seat against the valve member 13 in the direction of flow to close the opening 21. The stem 18 has lugs 23 within the valve member 13 to contact with said valve member when the valve stem is pushed into the casing, the space between the collar 22 and lugs 23 being sufficient to permit the collar or valve 22 to be unseated from the valve member 13 when the lugs 23 contact with said valve member.

A piston and packing member 24 of rubber or similar material is mounted within the casing and has a piston portion 25 projecting into the port 11 to enter the chamber or recess 28 of the valve member 13 which is surrounded by the flange 14. This flange is preferably formed with a bevelled edge 26, so that the flange will move over the member 24 without catching. The member 24 is molded or otherwise engaged over a flared portion 27 with which the casing 7 is provided at the inner end of the guide 19, thereby securely fastening the member 24 in place. Said member loosely embraces the stem 18 to prevent the fluid from leaking out along said stem.

Figure 2:
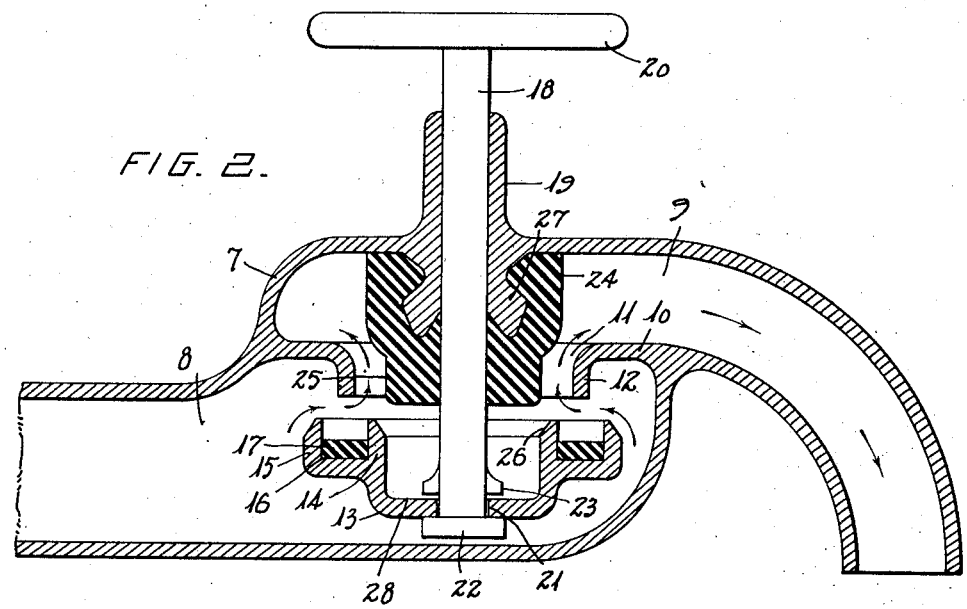
Fig. 2 is a similar view showing the valve open.

When the valve is closed, as seen in Fig. 1, with the gasket 17 bearing against the lip 12, the portion 25 of the member 24 extends into the chamber 28, and the collar or relief valve 22 is seated against the valve member 13 across the opening 21. By pushing down on the stem 18 the collar 22 is moved from the valve member 13, thereby opening the chamber 28 through the opening 21, so as to relieve the pressure in said chamber, and the lugs 23 contacting with the valve member 13 will move it open, thereby permitting the fluid to pass through the port 11 in the direction of the arrows as seen in Fig. 2.

When the stem 18 is released the valve is automatically closed by fluid pressure. The pressure moves the valve stem 18 outwardly, and the valve member 13 is also moved toward its seat. During the flow of fluid through the valve, the chamber 28 is filled with fluid which remains therein while the valve is closing. The collar or relief valve 22 is seated against the valve member 13 across the opening 21, and before the valve member 13 is seated, the chamber 28 receives the member 24, thereby providing a dash-pot arrangement to check or retard the closing movement of the valve with a cushioning action. The fluid is trapped within the chamber 28, the member 24 providing a piston working in the cylinder formed by the flange 14, so that the pressure of the fluid in the chamber 28 is built up to resist the final closing movement of the valve member 15. The pressure forces the fluid out slowly between the flange 14 and member 24, so that the valve member will seat with a slow gradual movement, and the closing action of the valve is therefore soft and free from jar, noise or shock.

The relief valve 22 is especially desirable with large valve structures, in order to relieve the pressure when opening the valve, and with valves of small size the relief valve may be eliminated, and the valve member 13 secured tightly to the valve stem.

Having thus described the invention, what is claimed as new is:—

1. A valve comprising a casing, a stem slidable therein, a valve member movable with the stem and having a chamber and a surrounding annular groove, a gasket in said groove, the casing having an annular valve seat to enter said groove for the contact of said gasket, and a packing and piston member of rubber or similar material mounted in the casing and having a portion to snugly enter said chamber during the closing movement of the valve member for retarding such closing movement.

2. A valve comprising a casing, a stem slidable therein, a valve member movable with the stem and having a chamber and a surrounding annular groove, the casing having an annular valve seat adapted to seat in said groove for closing the valve and a packing and piston member mounted in the casing and having a portion to snugly enter said chamber during the closing movement of the valve member for retarding such closing movement.

In testimony whereof I hereunto affix my signature.

JESSE D. LANGDON.